(12) United States Patent
Kuo et al.

(10) Patent No.: US 8,947,606 B2
(45) Date of Patent: Feb. 3, 2015

(54) DISPLAY DEVICE CAPABLE OF SWITCHING BETWEEN A TWO-DIMENSIONAL DISPLAYING MODE AND THREE-DIMENSIONAL DISPLAYING MODE

(71) Applicant: Hannstar Display Corp., New Taipei (TW)

(72) Inventors: Feng Wei Kuo, New Taipei (TW); Dong Xian Yu, New Taipei (TW); I Fung Wang, New Taipei (TW); Chun-Chin Tseng, New Taipei (TW); Chia-Hua Yu, New Taipei (TW)

(73) Assignee: Hannstar Display Corp., New Taipei (TW)

( * ) Notice: Subject to any disclaimer, the term of this patent is extended or adjusted under 35 U.S.C. 154(b) by 191 days.

(21) Appl. No.: 13/846,467

(22) Filed: Mar. 18, 2013

(65) Prior Publication Data

US 2014/0028932 A1    Jan. 30, 2014

(30) Foreign Application Priority Data

Jul. 26, 2012 (CN) .......................... 2012 1 0261517

(51) Int. Cl.
| | |
|---|---|
| G02F 1/133 | (2006.01) |
| G02F 1/1335 | (2006.01) |
| G02F 1/13 | (2006.01) |
| G02B 27/22 | (2006.01) |
| H04N 13/04 | (2006.01) |
| G02F 1/1343 | (2006.01) |
| G02F 1/29 | (2006.01) |

(52) U.S. Cl.
CPC .......... *G02F 1/133526* (2013.01); *G02B 27/22* (2013.01); *H04N 13/0404* (2013.01); *H04N 13/0454* (2013.01); *G02F 1/134363* (2013.01); *G02F 2001/294* (2013.01); *G02F 2203/28* (2013.01)
USPC ................................. 349/15; 349/95; 349/200

(58) Field of Classification Search
CPC .................... G02F 1/133526; G02F 1/133621; G02F 1/133512; G02F 2/29; G02F 2001/294; G02F 2203/28; G02B 27/26; G02B 27/2214; H04N 13/0404
USPC .............................................. 349/15, 95, 200
See application file for complete search history.

(56) References Cited

U.S. PATENT DOCUMENTS

2009/0190048 A1* 7/2009 Hong et al. ..................... 349/15

* cited by examiner

*Primary Examiner* — Mike Qi
(74) *Attorney, Agent, or Firm* — Muncy, Geissler, Olds & Lowe, P.C.

(57) ABSTRACT

A liquid crystal lens is disclosed, comprising a plurality of lens units, wherein each lens unit comprises a first substrate, a second substrate opposite to the first substrate, a liquid crystal layer disposed between the first substrate and the second substrate, an insulating layer disposed on the first substrate, and a first electrode and a first floating electrode disposed at opposite sides of the insulating layer, wherein the first electrode comprises a first portion neighboring a first side of the lens unit and a second portion neighboring a second side of the lens unit, and the first floating electrode comprises a first portion and a second portion, wherein the first portion of the first floating electrode is partially overlapped with the first portion of the first electrode, and the second portion of the first floating electrode is partially overlapped with the second portion of the first electrode.

12 Claims, 6 Drawing Sheets

DISPLAY DEVICE CAPABLE OF SWITCHING BETWEEN A TWO-DIMENSIONAL DISPLAYING MODE AND THREE-DIMENSIONAL DISPLAYING MODE

CROSS-REFERENCE TO RELATED APPLICATION

This Application claims priority of China Patent Application No. 20121026517.7, filed on Jul. 26, 2012, the entirety of which is incorporated by reference herein.

BACKGROUND OF THE INVENTION

1. Field of the Invention

This invention generally relates to a display device capable of switching between a two-dimensional displaying mode and three-dimensional displaying mode, and more particularly, to a display device capable of switching between a two-dimensional displaying mode and three-dimensional displaying mode and comprising floating electrodes to decrease driving voltage.

2. Description of the Related Art

The three-dimensional displaying technique principle uses a method where the left and right eyes of a viewer receive different images. The images received by the left and right eyes are overlapped and analyzed by the brain for the viewer to sense a three-dimensional image having gradation and depth. The current three-dimensional displaying technique uses a barrier LC cell technique which uses an optical grating to block light, for eyes to generate parallax, so that a three-dimensional image may be sensed. However, this technique has an issue which reduces brightness of the images.

Another technique which switches between a two-dimensional displaying mode and three-dimensional displaying mode uses liquid crystal lenses. The conventional liquid crystal technique uses an electric field to drive liquid crystal molecules in a liquid crystal layer for the long axis of the liquid crystal molecules to change orientations according to the electric field to form a lens-like structure. However, as shown in FIG. 1 which shows a rotation simulating diagram of switching cells of liquid crystal lenses under the condition where 6.5V is applied, distance between the electrodes 102 and 104 of the conventional liquid crystal lens is too great. Since liquid crystals between the electrodes 102 and 104 are too far away from the electrodes 102 and 104, electric power lines cannot reach the central portion of the liquid crystal lens and it is not easy for the liquid crystal molecules at the central portion to rotate. Accordingly, large voltages, such as 15V~25V, are required to drive liquid crystal molecules at the central portion between the two electrodes 102 and 104 for forming a liquid crystal lens with gradient-index.

BRIEF SUMMARY OF INVENTION

An aspect of the invention provides a liquid crystal lens, comprising a plurality of lens units, wherein each lens unit comprises a first substrate, and a second substrate opposite to the first substrate. A liquid crystal layer is disposed between the first substrate and the second substrate, and an insulating layer is disposed on the first substrate. A first electrode and a first floating electrode are disposed at opposite sides of the insulating layer, wherein the first electrode comprises a first portion neighboring a first side of the lens unit and a second portion neighboring a second side of the lens unit. The first floating electrode comprises a first portion and a second portion, wherein the first portion of the first floating electrode is partially overlapped with the first portion of the first electrode, and the second portion of the first floating electrode is partially overlapped with the second portion of the first electrode.

Another aspect of the invention provides a display device capable of switching between a two-dimensional displaying mode and three-dimensional displaying mode, comprising a plurality of lens units, wherein each lens unit comprises a first substrate, a second substrate opposite to the first substrate, a liquid crystal layer disposed between the first substrate and the second substrate, an insulating layer disposed on the first substrate, and a first electrode disposed overlying the first substrate, a first floating electrode isolated from the first electrode by the insulating layer; and a second electrode disposed on the second substrate. The first electrode comprises a first portion neighboring a first side of the lens unit and a second portion neighboring a second side of the lens unit. The first floating electrode comprises a first portion and a second portion, wherein the first portion of the first floating electrode is partially overlapped with the first portion of the first electrode, and the second portion of the first floating electrode is partially overlapped with the second portion of the first electrode

BRIEF DESCRIPTION OF DRAWINGS

The invention can be more fully understood by reading the subsequent detailed description and examples with references made to the accompanying drawings, wherein.

DETAILED DESCRIPTION OF INVENTION

It is understood that specific embodiments are provided as examples to teach the broader inventive concept, and one of ordinary skill in the art can easily apply the teaching of the present disclosure to other methods or apparatus. The following discussion is only used to illustrate the invention, not limit the invention.

The invention provides a novel switch cell of a liquid crystal lens with reduced driving voltage that can save electric power.

Figure 1:
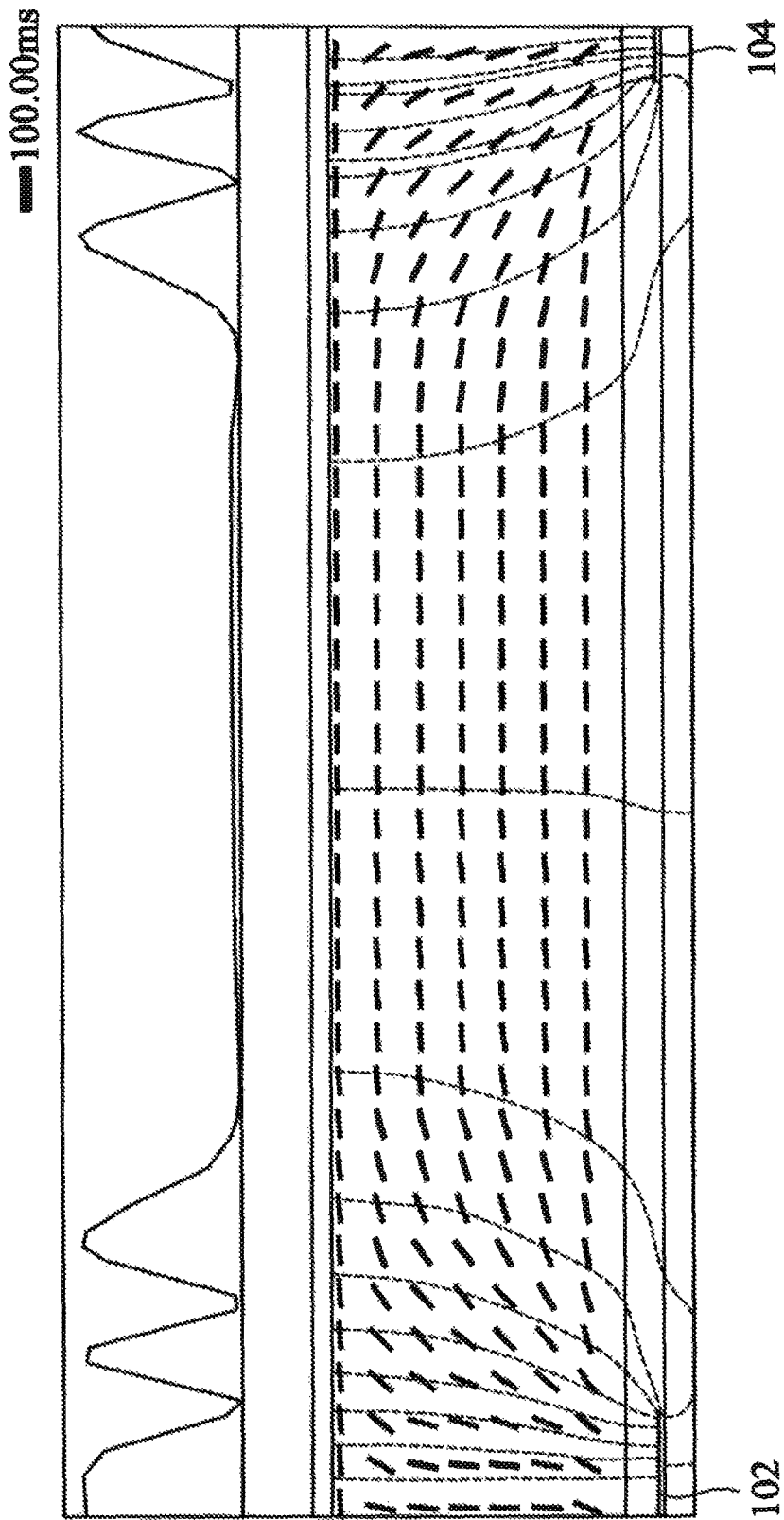
FIG. 1 shows a rotation simulating diagram of switching cells of liquid crystal lenses under the condition where 6.5V is applied.
Figure 2:
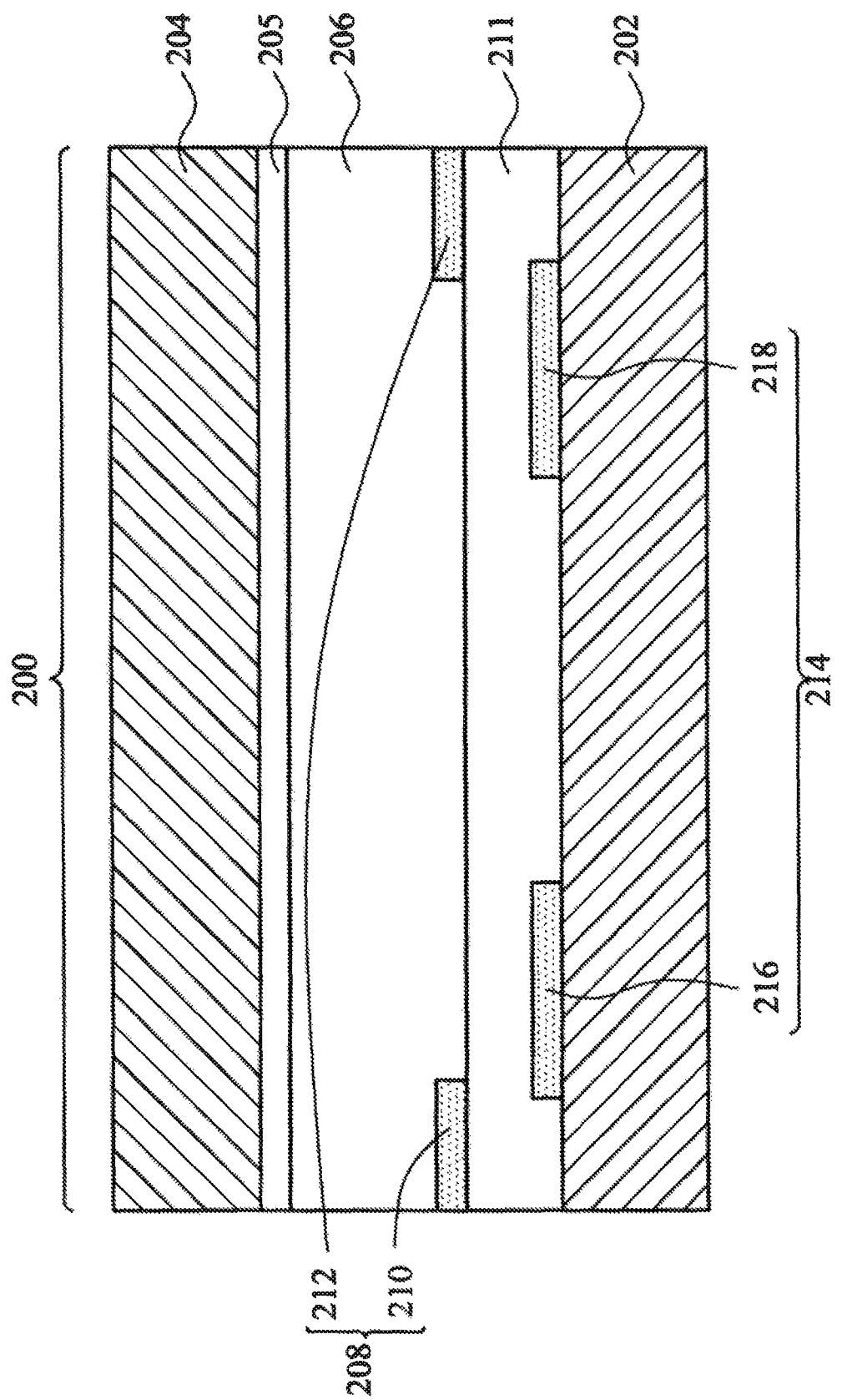
FIG. 2 shows a switch cell of a liquid crystal lens of an embodiment of the invention.

A switch cell of a liquid crystal lens of an embodiment of the invention is illustrated in accordance with FIG. 2. For simplicity, FIG. 2 only shows a cross section of a single lens unit 200. Referring to FIG. 2, a first substrate 202 and a second substrate 204 are provided, wherein the first substrate 202 and the second substrate 204 are disposed oppositely. A liquid crystal layer 206 is disposed between the first substrate 202 and the second substrate 204. In an embodiment of the invention, the first substrate 202 and the second substrate 204 are glass substrates, but the invention is not limited thereto. The first substrate 202 and the second substrate 204 can comprise other transparent materials. An insulating layer 211 is disposed on the first substrate 202. A first electrode 208 is disposed on the insulating layer 211, wherein the first electrode 208 comprises a first portion 210 neighboring a first side of the lens unit 200 and a second portion 212 neighboring a second side of the lens unit 200. A floating electrode 214 is disposed between the insulating layer 211 and the first substrate 202, wherein the floating electrode 214 comprises a first portion 216 and a second portion 218. The first portion 216 is partially overlapped with the first portion 210 of the first electrode 208, and the second portion 218 is partially overlapped with the second portion 212 of the first electrode 208. A second electrode 205 is disposed on the second substrate 204. A first alignment layer (not shown) is disposed on a side of the first electrode 208 and the insulating layer 211 neighboring the liquid crystal layer 206, and a second alignment layer (not shown) is disposed on a side of the second electrode 205 neighboring the liquid crystal layer 206. In an embodiment of the invention, the insulating layer 211 comprises silicon nitride or silicon oxide, but the invention is not limited thereto. The insulating layer 211 can comprise other transparent insulating materials. The first electrode 208, the second electrode 205 and the floating electrode 214 can comprise Cu, Al, W or other high electrical conductance materials.

It is noted that the floating electrode 214 and the first electrode 208 are isolated with each other. The floating electrode 214 is not applied with a voltage, but inductive capacitance is formed between the floating electrode 214 and the first electrode 208. It is noted that the floating electrode is not electrically connected with external circuits.

Figure 3:
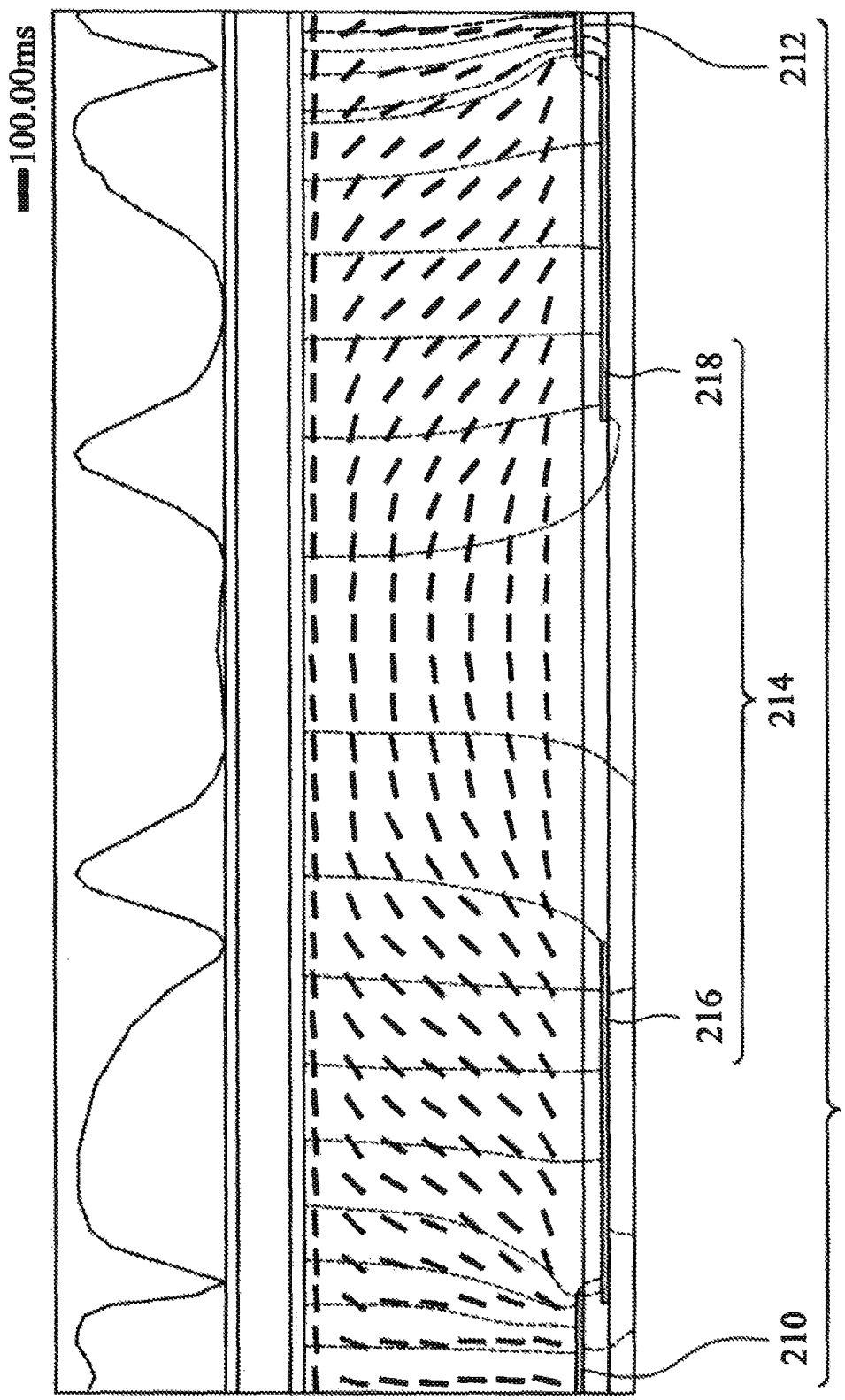
FIG. 3 shows a rotation simulating diagram of liquid crystal molecules of a switch cell of a liquid crystal lens applied with 6.5V.

FIG. 3 shows a rotation simulating diagram of liquid crystal molecules of a switch cell of a liquid crystal lens applied with 6.5V. Referring to FIG. 3, due to the floating electrode 214, the invention does not need a large voltage to drive the liquid crystal molecules at a central portion between the first electrode 208 and the second electrode 205. The electric power lines can extend to be neighboring the central portion of the lens unit under the help of inductance of the floating electrode 214 to the first electrode 208. Therefore, intensity of the electric power lines can be gradually changed from two sides to the central portion of the lens unit for forming a liquid crystal lens with gradient-index. Intensity of the electric power lines gradually become greater or taper depending upon the arrangement of the electrodes.

Figure 4:
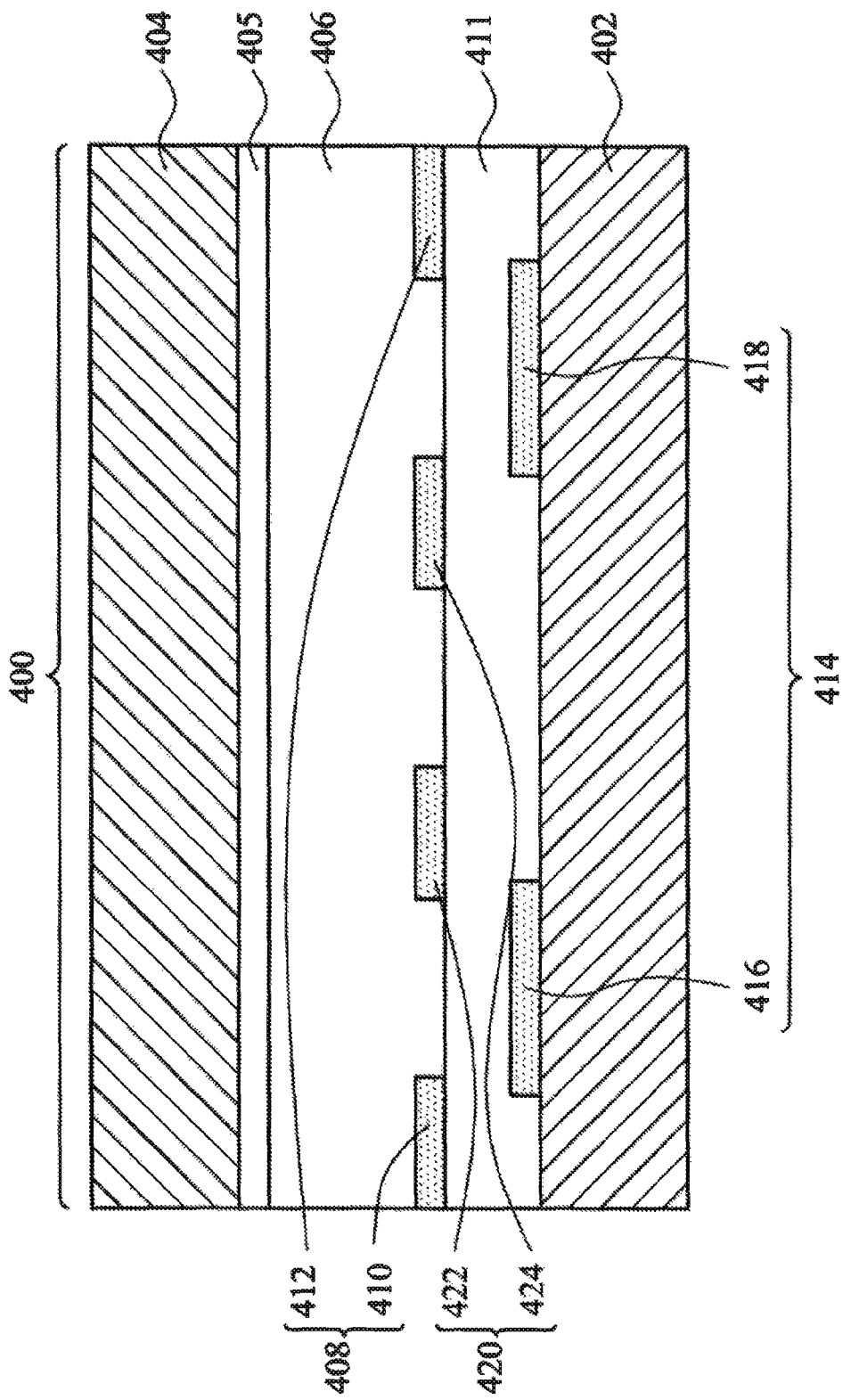
FIG. 4 shows a switch cell of a liquid crystal lens of another embodiment of the invention.

A switch cell of a liquid crystal lens 400 of another embodiment of the invention is illustrated in accordance with FIG. 4. For simplicity, FIG. 4 only shows a cross section of a single lens unit 400. Referring to FIG. 4, a first substrate 402 and a second substrate 404 are provided, wherein the first substrate 402 and the second substrate 404 are disposed oppositely. A liquid crystal layer 406 is disposed between the first substrate 402 and the second substrate 404. In an embodiment of the invention, the first substrate 402 and the second substrate 404 are glass substrates, but the invention is not limited thereto. The first substrate 402 and the second substrate 404 can comprise other transparent materials. An insulating layer 411 is disposed on the first substrate 402. A first electrode 408 is disposed on the insulating layer 411, wherein the first electrode 408 comprises a first portion 410 neighboring a first side of the lens unit 400 and a second portion 412 neighboring a second side of the lens unit 400. A first floating electrode 414 is disposed between the insulating layer 411 and the first substrate 402, wherein the first floating electrode 414 comprises a first portion 416 and a second portion 418, and the first portion 416 is partially overlapped with the first portion 410 of the first electrode 408, and the second portion 418 is partially overlapped with the second portion 412 of the first electrode 408. A second floating electrode 420 is disposed on the insulating layer 411, wherein the second floating electrode 420 comprises a first portion 422 and a second portion 424, and the first portion 422 is partially overlapped with the first portion 416 of the first floating electrode 414, and the second portion 424 is partially overlapped with the second portion 418 of the first floating electrode 414. A second electrode 405 is disposed on the second substrate 404. A first alignment layer (not shown) is disposed on a side of the first electrode 408, the second floating electrode 420, and the insulating layer 411 neighboring the liquid crystal layer 406, and a second alignment layer (not shown) is disposed on a side of the second electrode 405 neighboring the liquid crystal layer 406. In an embodiment of the invention, the insulating layer 411 comprises silicon nitride or silicon oxide, but the invention is not limited thereto. The insulating layer 411 can comprise other transparent insulating materials. The first electrode 408, the second electrode 405, the first floating electrode 414 and the second floating electrode 420 can comprise Cu, Al, W or other high electrical conductance materials.

It is noted that the first electrode 408 and the first floating electrode 414 are isolated with each other, and the first floating electrode 414 and the second floating electrode 420 are isolated with each other. The first floating electrode 414 and the second floating electrode 420 are not applied with a voltage, but inductive capacitance is formed between the first electrode 408 and the first floating electrode 414, and inductive capacitance is formed between the first floating electrode 414 and the second floating electrode 420.

Figure 5A:
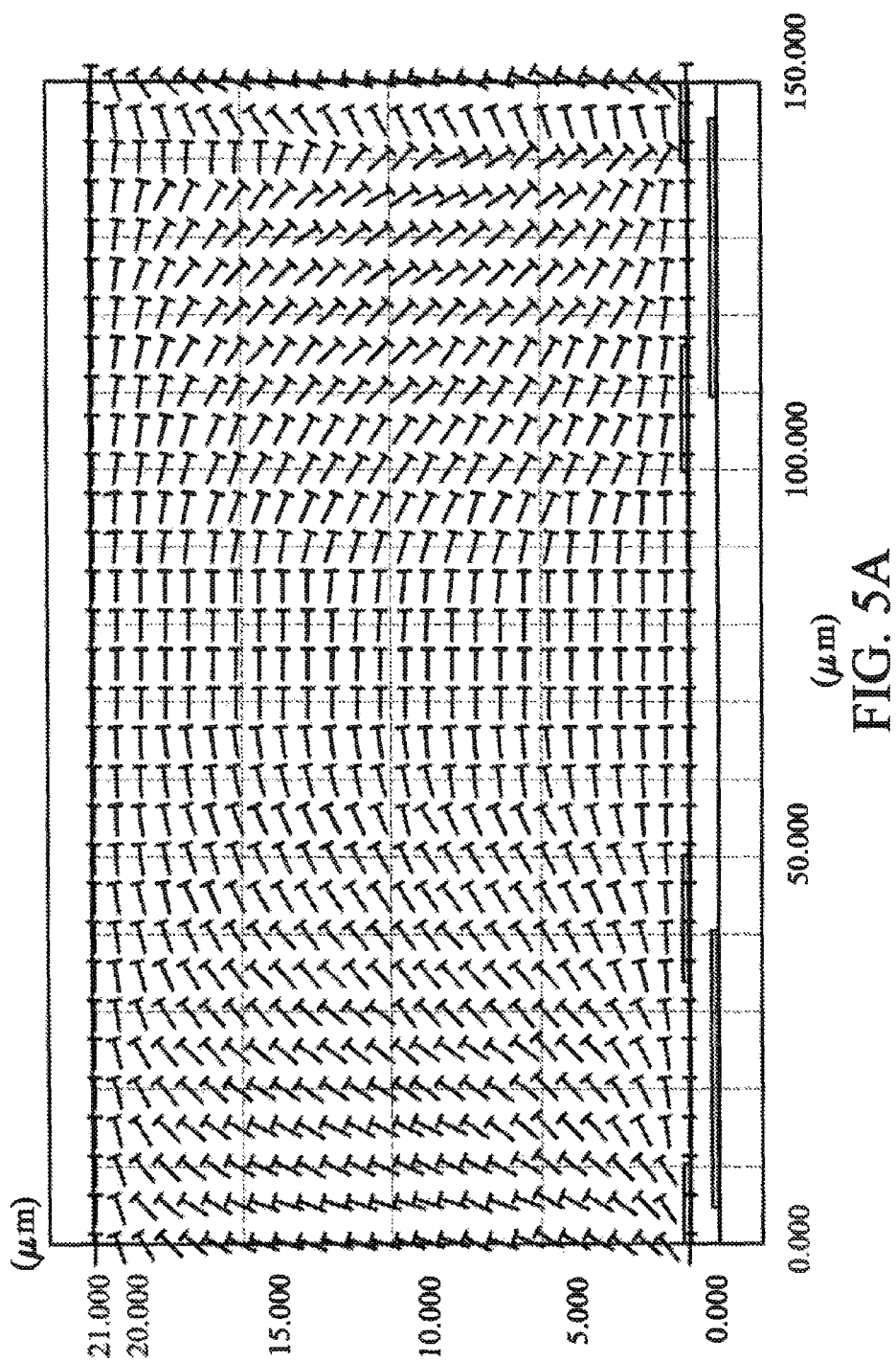
FIG. 5A shows a rotation simulating diagram of liquid crystal molecules of a switch cell of a liquid crystal lens applied with 5.8V.
Figure 5B:
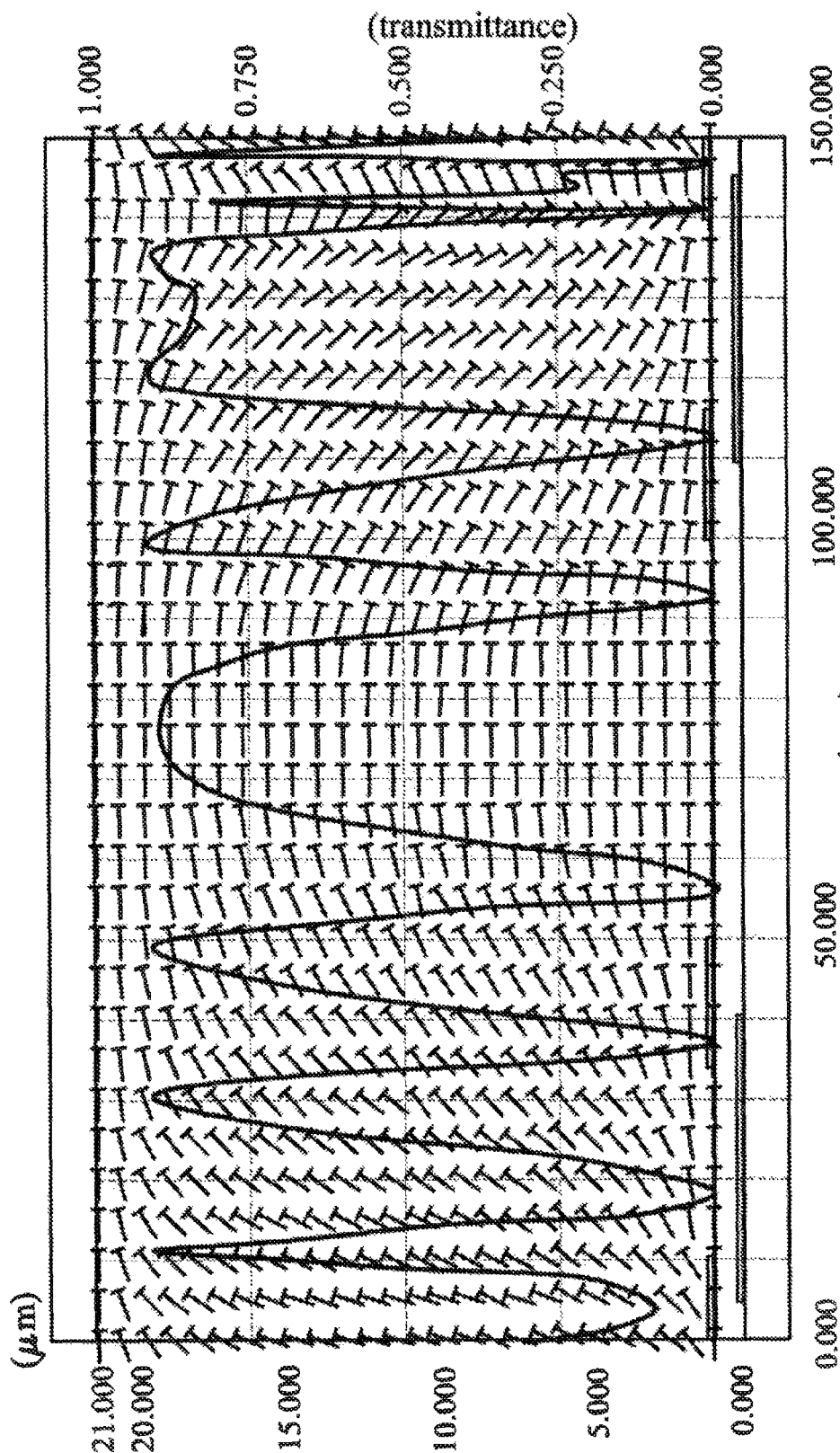
FIG. 5B shows a curve of an electric power line of a switch cell of a liquid crystal lens applied with 5.8V.

FIG. 5A shows a rotation simulating diagram of liquid crystal molecules of a switch cell of a liquid crystal lens applied with 5.8V, and FIG. 5B shows a curve of a electric power line of a switch cell of a liquid crystal lens applied with 5.8V. Referring to FIG. 5A and FIG. 5B, due to the first floating electrode and the second floating electrode, the invention does not need a large voltage to drive the liquid crystal molecules at a central portion between the first electrode and the second electrode. The electric power lines can extend to be neighboring the central portion of the lens unit under the help of inductance of the first floating electrode to the first electrode and the second floating electrode to the second electrode. Therefore, intensity of the electric power lines can be gradually changed from two sides to the central portion of the lens unit for forming a liquid crystal lens with gradient-index. Intensity of the electric power lines gradually become greater or taper depending upon the arrangement of electrodes.

It is understood that the invention is not limited to the liquid crystal lens described above, but also comprises a display device comprising the liquid crystal lens to be capable of switching between a two-dimensional displaying mode and three-dimensional displaying mode.

While the invention has been described by way of example and in terms of the preferred embodiments, it is to be understood that the invention is not limited to the disclosed embodiments. It is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal lens, comprising a plurality of lens units, wherein each lens unit comprises:
   a first substrate;
   a second substrate opposite to the first substrate;

a liquid crystal layer disposed between the first substrate and the second substrate;

an insulating layer disposed on the first substrate; and a first electrode and a first floating electrode disposed at opposite sides of the insulating layer, wherein the first electrode comprises a first portion neighboring a first side of the lens unit and a second portion neighboring a second side of the lens unit, and the first floating electrode comprises a first portion and a second portion, wherein the first portion of the first floating electrode is partially overlapped with the first portion of the first electrode, and the second portion of the first floating electrode is partially overlapped with the second portion of the first electrode.

2. The liquid crystal lens as claimed in claim 1, wherein the first floating electrode is isolated from the first electrode.

3. The liquid crystal lens as claimed in claim 1, wherein the first floating electrode is not applied with a voltage, and inductive capacitance is formed between the first electrode and the first floating electrode.

4. The liquid crystal lens as claimed in claim 1, further comprising a second electrode disposed on the second substrate.

5. The liquid crystal lens as claimed in claim 4, further comprising a first alignment layer on a side of the first electrode and the insulating layer neighboring the liquid crystal layer, and a second alignment layer on a side of the second electrode neighboring the liquid crystal layer.

6. The liquid crystal lens as claimed in claim 1, further comprising a second floating electrode disposed on the insulating layer, wherein the second floating electrode comprises a first portion and a second portion, wherein the first portion of the second floating electrode is partially overlapped with the first portion of the first floating electrode, and the second portion of the second floating electrode is partially overlapped with the second portion of the first floating electrode.

7. The liquid crystal lens as claimed in claim 6, wherein the second floating electrode is isolated from the first floating electrode, the second floating electrode is not applied with a voltage, and inductive capacitance is formed between the first floating electrode and the second floating electrode.

8. A display device capable of switching between a two-dimensional displaying mode and three-dimensional displaying mode, comprising a plurality of lens units, wherein each lens unit comprises:

a first substrate;

a second substrate opposite to the first substrate;

a liquid crystal layer disposed between the first substrate and the second substrate;

an insulating layer disposed on the first substrate;

a first electrode disposed overlying the first substrate, wherein the first electrode comprises a first portion neighboring a first side of the lens unit and a second portion neighboring a second side of the lens unit;

a first floating electrode isolated from the first electrode by the insulating layer, wherein the first floating electrode comprises a first portion and a second portion, wherein the first portion of the first floating electrode is partially overlapped with the first portion of the first electrode, and the second portion of the first floating electrode is partially overlapped with the second portion of the first electrode; and a second electrode disposed on the second substrate.

9. The display device as claimed in claim 8, wherein the first floating electrode is not applied with a voltage, and inductive capacitance is formed between the first electrode and the first floating electrode.

10. The display device as claimed in claim 8, further comprising a second floating electrode isolated from the first floating electrode by the insulating layer, wherein the second floating electrode comprises a first portion and a second portion, wherein the first portion of the second floating electrode is partially overlapped with the first portion of the first floating electrode, and the second portion of the second floating electrode is partially overlapped with the second portion of the first floating electrode.

11. The display device as claimed in claim 10, wherein when the second floating electrode is not applied with a voltage, and inductive capacitance is formed between the first floating electrode and the second floating electrode.

12. The display device as claimed in claim 8, further comprising a first alignment layer on a side of the insulating layer neighboring the liquid crystal layer, and a second alignment layer on a side of the second electrode neighboring the liquid crystal layer.

* * * * *